(12) United States Patent
Quante et al.

(10) Patent No.: US 9,976,689 B2
(45) Date of Patent: May 22, 2018

(54) FIRE PROTECTED ELASTOMERIC INSULATION

(75) Inventors: Heribert Quante, Marienmünster (DE); Friedhelm Vielmeyer, Münster (DE); Jürgen Weidinger, Münster (DE)

(73) Assignee: ARMACELL ENTERPRISE GMBH & CO. KG, Schoenefeld Ot Waltersdorf (DE)

( * ) Notice: Subject to any disclaimer, the term of this patent is extended or adjusted under 35 U.S.C. 154(b) by 1234 days.

(21) Appl. No.: 13/241,994

(22) Filed: Sep. 23, 2011

(65) Prior Publication Data

US 2012/0118589 A1 May 17, 2012

(30) Foreign Application Priority Data

Nov. 16, 2010 (EP) ..................... 10191291

(51) Int. Cl.
| | | |
|---|---|---|
| *B32B 5/02* | (2006.01) | |
| *F16L 59/14* | (2006.01) | |
| *B32B 15/08* | (2006.01) | |
| *B32B 15/20* | (2006.01) | |
| *B32B 27/12* | (2006.01) | |
| *E04B 5/02* | (2006.01) | |
| *E04B 1/76* | (2006.01) | |
| *B29K 105/04* | (2006.01) | |

(52) U.S. Cl.
CPC .............. *F16L 59/145* (2013.01); *B32B 5/02* (2013.01); *B32B 15/08* (2013.01); *B32B 15/20* (2013.01); *B32B 27/12* (2013.01); *E04B 5/02* (2013.01); *B29K 2105/046* (2013.01); *B29K 2995/0002* (2013.01); *B29K 2995/0015* (2013.01); *B29K 2995/0016* (2013.01); *B32B 2260/021* (2013.01); *B32B 2262/101* (2013.01); *B32B 2274/00* (2013.01); *B32B 2307/3065* (2013.01); *B32B 2307/72* (2013.01); *E04B 2001/7691* (2013.01); *Y10T 428/24612* (2015.01); *Y10T 428/24942* (2015.01); *Y10T 428/24999* (2015.04); *Y10T 428/249976* (2015.04); *Y10T 428/249982* (2015.04); *Y10T 428/249985* (2015.04); *Y10T 442/3179* (2015.04); *Y10T 442/3415* (2015.04); *Y10T 442/475* (2015.04); *Y10T 442/643* (2015.04); *Y10T 442/644* (2015.04); *Y10T 442/656* (2015.04)

(58) Field of Classification Search
CPC ...... B29K 2105/046; B29K 2995/0002; B29K 2995/0015; B29K 2995/0016; B32B 15/08; B32B 15/20; B32B 2260/021; B32B 2262/101; B32B 2274/00; B32B 2307/3065; B32B 2307/72; B32B 27/12; B32B 5/02; E04B 2201/7691; E04B 5/02; F16L 59/145; Y10T 428/24612; Y10T 428/24942; Y10T 428/249976; Y10T 428/249982; Y10T 428/249985; Y10T 428/24999; Y10T 442/3179; Y10T 442/3415; Y10T 442/475; Y10T 442/643; Y10T 442/644; Y10T 442/656

USPC ......... 428/297.1, 304.4, 308.4, 314.2, 314.4, 428/319.1, 317.1, 317.7, 920, 921; 442/1, 442/136, 152, 172, 180, 221, 232, 316, 442/366, 367, 378, 331; 156/77; 169/43

See application file for complete search history.

(56) References Cited

U.S. PATENT DOCUMENTS

| | | | | |
|---|---|---|---|---|
| 3,615,276 A | * | 10/1971 | Singleton | ............... 428/608 |
| 3,658,579 A | * | 4/1972 | Ottinger | ............ C08K 3/32 |
| | | | | 428/475.8 |
| 4,256,799 A | * | 3/1981 | Ohashi et al. | ............ 428/215 |
| 4,279,958 A | | 7/1981 | Ahmad | |
| 4,292,369 A | | 9/1981 | Ohashi et al. | |
| 4,388,366 A | * | 6/1983 | Rosato | ............... B32B 5/18 |
| | | | | 428/312.6 |
| 4,557,961 A | * | 12/1985 | Gorges | ............... B32B 3/12 |
| | | | | 428/117 |
| 4,569,884 A | * | 2/1986 | Weinand et al. | ............ 442/263 |
| 5,698,302 A | | 12/1997 | Brandon et al. | |
| 5,698,304 A | * | 12/1997 | Brandon | ............ B29C 44/065 |
| | | | | 428/215 |
| 6,468,613 B1 | * | 10/2002 | Kitano et al. | ............ 428/35.8 |
| 2011/0174509 A1 | * | 7/2011 | Quante et al. | ............ 169/45 |
| 2011/0183096 A1 | * | 7/2011 | Lembo | ............ B32B 1/08 |
| | | | | 428/36.5 |
| 2011/0183565 A1 | * | 7/2011 | Menning | ............ C08J 9/28 |
| | | | | 442/286 |
| 2012/0045637 A1 | * | 2/2012 | Weidinger | ............ C08J 3/243 |
| | | | | 428/314.4 |

FOREIGN PATENT DOCUMENTS

| | | | |
|---|---|---|---|
| CH | 650196 A5 | 7/1985 | |
| CN | 1613640 A | 5/2005 | |
| DE | 19640887 A1 | 4/1998 | |
| EP | 2116753 A1 | 11/2009 | |

(Continued)

OTHER PUBLICATIONS

European Search Report issued in European Application No. 10191291.3 dated Mar. 29, 2011, 6 pages.

*Primary Examiner* — Arti Singh-Pandey

(74) *Attorney, Agent, or Firm* — Rothwell, Figg, Ernst & Manbeck, P.C.

(57) ABSTRACT

The present invention relates to a versatile multi-layer elastomer or thermoplastic elastomer based thermal and/or sound insulation material with improved fire retardant properties together with low smoke generation, the process for manufacturing of such material and the use of such material and resulting composites.

23 Claims, 2 Drawing Sheets

(56) References Cited

FOREIGN PATENT DOCUMENTS

| EP | 2345535 A1 | 7/2011 |
|----|------------|--------|
| GB | 2222185 A | 2/1990 |
| GB | 2277710 A | 11/1994 |
| GB | 2378919 A | 2/2003 |
| JP | 8199709 A | 8/1996 |
| KR | 10-2006-0021127 A | 3/2006 |

\* cited by examiner

FIRE PROTECTED ELASTOMERIC INSULATION

BACKGROUND OF THE INVENTION

Field of the Invention

The present invention relates to a versatile multi-layer elastomer or thermoplastic elastomer based thermal and/or sound insulation material with improved fire retardant properties together with low smoke generation, the process for manufacturing of such material and the use of such material and resulting composites.

Description of the Background Art

Elastomeric materials have been used since long time for insulation purposes as expanded material (see e.g. brands Armaflex®, K-Flex®). However, as elastomers are of organic nature and due to the fact that cellular material is more sensitive to ignition than massive elastomer, said expanded elastomers tend to be flammable to very flammable.

Numerous attempts have been taken to improve the flame retardancy of organic polymer foams, such as by loading the elastomer compound with internal flame retardants as it is standard in the rubber industry and/or by applying flame retardant protective layers: one could think of composites where specially flame-protected polymers form the outer layer, but the most widespread approach for fire protection is the use of an outer layer consisting of a metal foil or sheet, mostly aluminium due to applicability and cost issues, often together with one or more inner layer(s) showing no or low combustibility.

This technology has been used to almost an exhaust in many varieties: aluminium honeycombs filled with rigid foam, metal foil with mineral wool underneath, foil layer wire netting underneath, outer foil in some varieties, perforated foil, fibres underneath, or foil together with intumescent systems. Most inventors claim the use of metal foil or sheet and fibres (woven or nonwoven) for example in conjunction with low-combustible fibres (aluminium/polyester or polyamide or several fibrous layers), but mostly non-combustible fibres. There are several patents in which the inventors all use metal—mostly aluminium—foil as the outermost layer with (glass) fibre or tissue or scrim underneath and foil with holes, fibres.

Other inventors claim the use of low-combustible fibres or non-combustible fibres (mainly glass fibres) only as an outer layer, sometimes in conjunction with other layers, such as glass fibre coating, fibres in matrix, internal layer low-combustible material, inorganic fibre layer, partially filled with non-combustibles, non-combustible fibre and bamboo layer, fibre on foam-filled honeycombs, fibre reinforced outer resin layer or fibres/foils on intumescent layer. Other patents claim glass fibres as outer layer or the use of multiple fibre layers for building a structure, but they do not target fire performance explicitly. CN 1613640 mentions a double felt layer with flame retardant impregnation; U.S. Pat. No. 5,698,302 mentions a double glass fibre layer on rigid foam wherein however, the layer is neither described nor intended as fire retardant fibrous material, as it is applied on polymeric material comprising flame retardant resin itself; DE 19640887 claims a layer of fibre-reinforced silicate for fire protection purposes.

All of the aforementioned inventions focus on mainly rigid foams to protect, except GB 2378919, where a rubber-like inner layer is disclosed, however, the whole composite has to be essentially rigid again. In total, all these methods indeed cover a large variety of requirements concerning flame retardancy; however, their individual versatility is limited and their performance is strongly depending on the substrate, on how the layers are applied etc. Therefore, most of the aforementioned inventions require or at least mention flame retardant properties for the substrate itself, too.

Requirements and flammability test related approvals within the building industry become more and more global, but also more precise and application-related and therefore more challenging (e.g. ASTM E-84, EN 13823), as smoke creation and density are considered in addition to the flammability.

Accordingly, we found during our research that the aforementioned prior art is not suitable to safely reach the highest possible flame retardancy classes for organics (e.g. B s1 d0 for EN 13823/EN 13501-1, V-0 for UL 94 etc.) even for the most widespread polymer foam bases, and in some cases these systems even lead to worse performance (see results for laminated AF in Table 1). Systems that perform better (e.g. at least reaching B s3 d0 or V-1 class, respectively) showed to be expensive, complex and neither economic nor ecologic.

A general deficiency of the aforementioned materials is the fact that the flame retardant measures taken will lead to incomplete combustion, thus particles being content of the smoke leading to high smoke density, together with partially high smoke creation, too. There are other reasons for the fail of the traditional protection systems that are discussed below.

Some prior art is not based on traditional systems: KR 1020060021127 reveals composites with a protective polymer layer on an aluminium foil layer which itself is on top of foam. However, this system is not claimed for fire protection performance, and possibly would not match the respective requirements as the polymer is too easy burning. CH 650196 is describing an interesting composite said to be flame-retardant where the aluminium foil is perforated and being the second layer, covered by an outer layer of polyester fibres containing flame-retardants. Also the aforementioned JP 8199709 is describing a system where the metal foil does not necessarily have to be the outermost layer.

However, even these non-classic systems show deficiencies concerning applicability, reproducibility and consistency of the fire test results according to our research. For example, JP 8199709 correctly describes that the slow-burning outer layer containing flame retardant agents will disperse the heat of the burn by aid of the aluminium conductor beneath, however, we found that from a certain point of time on this dispersion ability is saturated and the overheating of the metal layer will cause an undesired flashover of both the outer layer and the substrate, leading to complete combustion of the composite around the foil. The composite mentioned in CH 650196 will show this effect at a slightly later point of time, but will end in a flashover anyway. The reason for the retarding of the flashover here is due to the perforation of the foil allowing the heat to disperse even into the substrate, but not up to a critical level where flammable gases would be formed. Eventually, also the correct assumption of GB 2222185 that a first layer that can melt away from flames would be of protective function showed to be of no use when applied for aforementioned testing methods and approvals as the melt layer finally ignited spontaneously anyway.

Additionally we observed significant creation of dark and/or dense smoke before and after the flashover in all three cases which would be another negative criterion concerning approvals. Furthermore, the vast majority of aforementioned layered materials would be very stiff and thus destroy some advantages provided by elastomeric, thus flexible expanded materials, such as for good and easy mounting and sealing tolerances etc.

SUMMARY OF THE INVENTION

A major object of the present invention thus is to provide a fire protected elastomeric material or system that is versatile, reliable, economic and easy to apply. It has to fulfil modern regulations in the respective application fields by dispersing flame and its heat to a maximum possible extent before it can reach or be transferred to the foam substrate. Furthermore, the formation of smoke has to be suppressed best way possible, all that by maintaining some of the essentially good properties of elastomers.

DETAILED DESCRIPTION OF THE INVENTION

Surprisingly, it is found that such a versatile material not showing the above mentioned disadvantages can be achieved when turning the state-of-the-art system round and using fibres of low or no combustibility as the outermost layer with a non combustible foil layer underneath. Alternatively a fibre layer on a second low- to non-combustible fibre layer can be used. Both solutions achieve appropriate properties for flame spread and heat dispersion, as well as for permeability for gases, but not for solid smoke particles.

Figure 1:
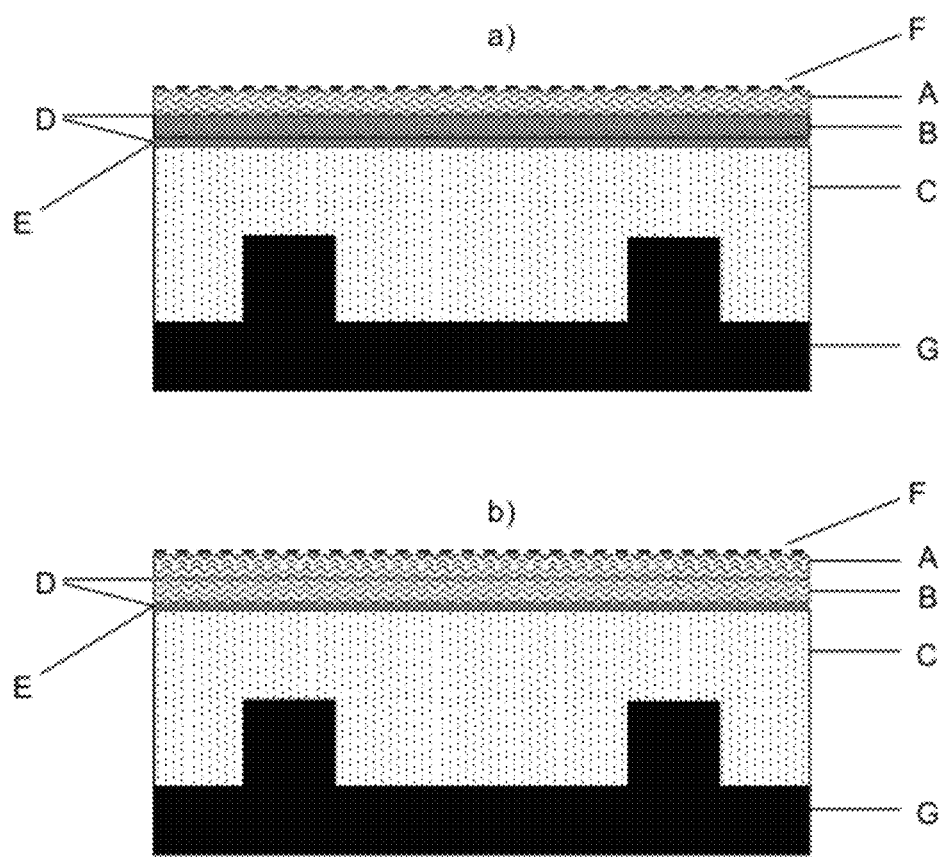
FIGS. 1a and 1b schematically illustrate multi-layer insulation structures according to the invention.

The claimed material comprises layer (A), see FIG. 1, which is at least one fibrous layer being applied as outermost layer, i.e. outer protective layer, on at least one—preferably the outer-surface of the layer (B) and/or the substrate/core (C), such as insulation panel/sheet or tube ("fibrous" in the context of this invention means fibres, slivers and chips of a length to width ratio of at least 10:1). The fibrous layer may comprise fibres and/or slivers of any inorganic or organic kind. Preferred are fibres and/or slivers showing low or no combustibility ("low combustibility" in the context of this invention means flame retardant according to at least DIN 4102 B1 and/or ASTM E-84 flame spread 100), such as from sisal, hemp, coconut fibre, cellulose, cotton, wool, bamboo as examples for natural or organic fibrous material, or from carbon, polyester, polyaramide, polyimide, PTFE, glass, metal, ceramic/mineral as examples for synthetic or inorganic fibrous material.

The fibres and/or slivers may be massive or hollow. The fibres and/or slivers may preferably be coated with a non-organic treatment (e.g. silane based), as organic processing aids widely used in the yarn and textile industry (such as stearic acids, animal and vegetable fats and oils etc.) may have a negative impact on flammability.

The fibre may be in the state of fabric or nonwoven. Preferred is nonwoven due to better economics at almost equal performance. Generally preferred are fibrous arrangements where an average mesh size or sieve opening would be 0.01 to 2.00 mm, preferred 0.04 to 0.80 mm, especially preferred from 0.10 to 0.25 mm; a preferred average thread or fibre density would be 5 to 500 per cm, preferred 10 to 250 per cm, especially preferred are 20 to 60 per cm.

(A) may be bond to other layers, e.g. (B), by adhesives, preferably flame retardant ones, or adhere by itself if properly equipped, e.g. by a melt layer.

The fibrous material may be embedded to at least 30 weight percent into a matrix to facilitate application of (A), to improve the surface aspect and the performance. Therefore, flame retardant matrix materials are preferred, such as CPE, PVC or polymer blends containing flame retardants or being flame retardant themselves.

The claimed material furthermore comprises at least one layer (B) as second outermost layer, i.e. inner protective layer, which is either at least one layer of perforated or non-perforated non combustible foil, preferably non-perforated. Metal foils are preferred (e.g. from aluminium, iron, copper etc.) as non combustible foil wherein a preferred thickness range for the foil is 1-400 microns, especially preferred are 2-50 microns. Aluminium is the preferred material as metal foil due to its good heat conductivity, good sealing property and excellent properties concerning the application (bonding/adhesion, compatibility etc.), see FIG. 1a.

A further possibility instead of a metal foil as layer (B) is at least one layer consisting of fibres and/or slivers of low or no combustibility, massive or hollow, such as from sisal, hemp, cellulose, coconut fibre, cotton, bamboo as examples for natural or organic fibrous material, or from carbon, polyester, polyaramide, polyimide, glass, ceramic/mineral as examples for synthetic or inorganic fibrous material, see FIG. 1b. Preferred are non combustible fibres and/or slivers, especially preferred are glass fibres with inorganic treatment, preferably as a fabric or nonwoven. A preferred average mesh or sieve opening size for the tissue is 0.01 to 0.80 mm, especially preferred from 0.08 to 0.5 mm; a preferred average thread or fibre density would be 5 to 250 per cm, especially preferred are 40 to 100 per cm.

The fibrous material may be embedded to at least 30 weight percent into a matrix to facilitate application of (B) and to improve the performance. Therefore, flame retardant matrix materials are preferred, such as CPE, PVC or polymer blends containing flame retardants or being flame retardant themselves.

(B) may be bond to other layers, e.g. (A) and (C), by adhesives, preferably flame retardant ones, or adhere by itself if properly equipped, e.g. by a melt layer which can be applied on both sides of (B).

(A) and (B) can also be prepared as a prefabricated composite laminate and then be applied onto (C) by melting, gluing, or any other connection method, e.g. in a lamination or co-extrusion process.

Figure 2:
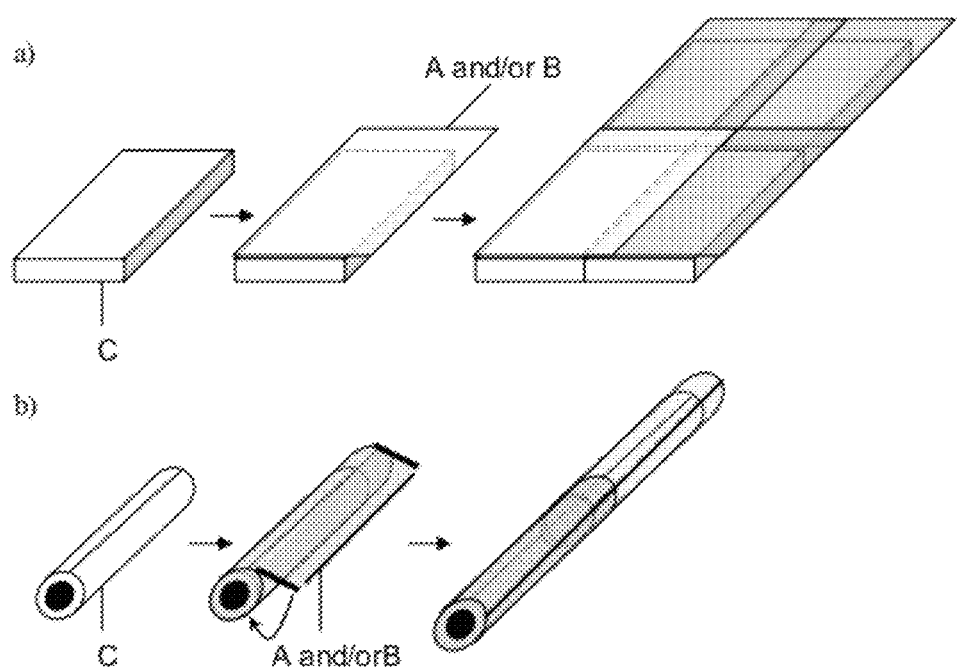
FIGS. 2a and 2b perspectively illustrate use of multi-layer insulation structures according to the invention.

(A) and/or (B) can be applied onto (C) in a way that one or more overlaps are formed which can be used as seam seal and/or butt joint. The respective overlaps can be adhered by adhesives, preferably of low or no combustibility, or adhere by themselves or fit mechanically. This lap seal is e.g. feasible for planar (see FIG. 2a) and tubular material (see FIG. 2b).

The claimed material furthermore comprises a substrate or core compound (C) underneath the layers (A) and (B), which comprises at least one layer of expanded crosslinked elastomer blend or expanded and optionally crosslinked thermoplastic elastomer blend, where both may be based on polymers of e.g. ACM/AEM, AU/EU, BR, BIIR, CIIR, CM/CPE, CR, CSM/CSR, (G)(E)CO, EPM/EPDM, EVM, FKM/F(E)PM, GPO, IR, IIR, (V)MQ, (H)NBR, NR, SBR, T etc., see FIG. 1.

The expanded elastomer or thermoplastic elastomer blend of (C) may comprise a crosslinking system, such as peroxides, hydrosilylation agents, radiation activators (for radiation or UV curing), sulphur compounds, bisphenolics, metal oxides etc.

The expanded elastomer or thermoplastic elastomer blend furthermore comprises at least one expansion agent chosen from the classes of chemical expansion agents (e.g. releasing carbon dioxide, nitrogen, oxygen or water) and/or physical expansion agents (e.g. solvents, CO2, N2, other gases).

The elastomer or thermoplastic elastomer blend may be expanded to a closed or open cell foam or sponge. Preferred is closed cell foam with a closed cell content of at least 80% and to a density of less than 200 kg/m3, preferably less than 100 kg/m3, especially preferred less than 65 kg/m3 according to ISO 845 to lower the thermal conductivity to less than 0.080 W/m*K at 0° C., preferably less than 0.040 W/m*K at 0° C. according to EN 12667.

The elastomer or thermoplastic elastomer blend furthermore may comprise one or more fillers of any kind, such as from the classes of metal and half metal oxides or hydroxides, carbon blacks, carbonates, sulphates, etc., and any combinations thereof.

The elastomer or thermoplastic elastomer blend furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and any combinations thereof.

The elastomer or thermoplastic elastomer blend furthermore may comprise all kinds of other fillers or additives, such as other elastomers, thermoplastic elastomers and/or thermoplastics and/or thermoset based polymer mixtures, or combinations thereof, or as recycled material, other recycled polymer based materials, fibres etc.

The elastomer or thermoplastic elastomer blend may comprise further additives such as flame retardants, biocides, plasticizers, stabilizers (e.g. versus UV, ozone, reversion etc.), colours etc., of any kind in any ratio, including additives for improving its manufacturing, application, aspect and performance properties, such as inhibitors, retarders, accelerators, etc.; and/or additives for adapting it to the applications' needs, such as char-forming and/or intumescent additives, like expanding graphite, to render the material self-intumescent in case of fire to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

(C) may show surface structures on one or both sides for sound and/or thermal decoupling purposes as well as for increasing the surface to adhere other layers to be applied. The structure can be of any shape, such as triangular, sinus shape, rectangular, trapezoidal, (semi)circular (semi)multi-edge (e.g. honeycomb) etc., and any combinations thereof. The structure of any shape can be applied in two dimensional manner, as e.g. ridges or tubes, or in three dimensional manner, as e.g. knobs, and any combinations thereof; the structure can be applied longitudinally or transversally or in any combinations thereof. This can be achieved by extrusion, embossing, deep-drawing, moulding, by applying the structure directly or by applying it onto a carrier (layer), in cold, warm or hot state, or in any combination of applicable methods. Accordingly, layers (B) and (A) on top of (C) can exhibit surface structures, too.

The claimed material contains a suitable system for adhesion (D) to bond the compounds (A), (B) and (C)—or the said layers to (E) and/or (F), respectively—to each other, respectively, see FIG. 1. Preferred are adhesion systems that are either fully compatible to the substrates to be connected to ensure good bonding (means: have similar polarity, morphology or surface energy and/or are based on the substrates polymer compound) and/or preferably with intrinsic flame retardant properties. Especially preferred are adhesives containing halogenated or phosphorous compounds, e.g. being based on elastomers or thermoplasts such as chloroprene, PVC, CPE, or the like, or adhesives of low to no flammability, such as silicate based adhesives like alkali silicate ("water glass") systems.

The adhesion system (D) does not have to be of same composition for bonding the layers (A) and (B) or (B) and (C), respectively, and can be freely chosen to match the individual requirements best possible; it can be of liquid or pasty state, or solid and be used as hot melt. As the flame protection effect of the layers (A) and (B) is very significant e.g. the bonding layer of (B) to (C) can even comprise flammable adhesives or hot melts like PE or acrylics.

The claimed material furthermore may contain additional functional layers (E) between (A) and (B) and/or between (B) and (C) and/or on top of (A) that can contribute both to the mechanical strength necessary for the intended application as well as to the fire retardant properties, see FIG. 1. The compounds for (E) thus may be e.g. fibres, foils, papers, sheet etc. in various forms, but also self-ceramifying, char-forming or intumescent compounds or compounds releasing flame-stopping or cooling or diluting substances, such as gas, vapour, liquids, halides etc., in case of fire; or flame retardant, e.g. halogenated (e.g. CR, CPE, PVC) or phoshorinated (e.g. containing phosphate groups) organic compounds. The compounds (E) may be bond to other compounds of the material by (D) or adhere by themselves.

The claimed material furthermore may contain additional functional layers (F) as covering on (A) to act e.g. as a shielding, a reinforcing or as a decorative or as a "loss in case of burn" layer, see FIG. 1. Preferred are layers that will either be flame-retardant themselves or easily be burning or melting away so not to disturb the functioning of the (A) (B) (C) layer system. The compounds (F) may be bond to other compounds of the material by (D) or adhere by themselves.

The claimed material furthermore may contain any further element (G) necessary for the intended application, such as wire inlays in case of cables or the like, massive parts such as wood, glass, metal or concrete structures for building purposes etc., and also metal pipes, e.g. from corrugated steel or copper, to make a pre-insulated pipe, see FIG. 1. The element (G) may be bond to other layers of the material by (D) or adhered by itself or be attached mechanically, loosely or tightly.

A major advantage of the claimed material is its suitability for applications in safety related environment where low flame spread and/or low smoke generation are required (e.g. simulated and approved by ASTM E-84, EN 13823/EN 13501-1, see Table 1 and 2). The performance ranging from flame-retardant to even flame-preventing is provided by the special effect that the layers of the claimed material will generate on the formation and on the migration of flammable gases in combination with the flame and heat dispersion, according to our results:

1. When hitting the first (outer) fibrous layer the flame is dispersed over a high surface and the net heat creation per surface unit thus is lowered significantly in comparison with smooth and/or closed surfaces, such as foil or sheet. Also the heat penetration into the composite is lower due to the mentioned dispersion, but also due to the low heat conductivity of the fibre in comparison with metal foils or polymeric layers. In comparison, the a.m. prior art systems using aluminium foil as outer layer will show flashover under most conditions due to melting and/or tearing of the foil in an early state of a flammability test.

2. When approaching the second layer the already weakened heat and flame will be either a) reflected by the metal foil or be further dispersed by the second fibrous layer. In case the heat would penetrate deeper into the expanded polymer this would decompose to combustible gases that will either be entrapped by the foil (tear of the foil due to gas pressure is prevented by the outer fibrous layer, a performance which is also not provided by prior art) and thus being kept away from possible flashover;

b) or the second fabric layer or the metal foil will slow down the migration of these gases to the surface or flame front and/or dilute said gases into the fibrous matrix to keep them below a critical limit per volume or surface unit.

Both effects 2a and 2b will prevent a flashover and together with 1 will result in a controlled, slow burn (slow, but supplied with sufficient oxygen, as it happens on the outer surface of the composite). This will not create much smoke in comparison with standard flame retardant systems that will lead to a "suppressed" burn (insufficient oxygen) with high smoke creation due to incomplete combustion (compare Table 1: SMOGRA and TSP values).

A very prominent advantage of the claimed material is its versatility concerning the fire tests and the results being almost independent from the substrate or core (see Table 2).

A further advantage of the claimed material linked to a.m. advantage is the fact that no additional measures have to be taken to render the substrate or core fire retardant.

This leads to a further advantage of the claimed material which is the free and economic as well as ecologic choice for foam substrate or core and its ingredients.

This leads to another advantage of the claimed material as no halogenated fire retardants are needed to achieve demanded flame resistance. Especially brominated flame retardants are critical for environmental issues and can generate toxic fumes in case of fire. For that reason brominated flame retardants are already partially prohibited. Due to this, also flame retardant synergists like antimony trioxide or metal salts of boric acid are not required, which are even under discussion or already restricted regarding their use.

It is a further advantage of the claimed material that critical chemicals (such as halogenated, phosphorous) can be dramatically reduced as the layered system takes over the anti-flame performance. By using silicate based adhesives even the last essential halogenated compounds (CR/CPE/PVC adhesives) could be abandoned. The silicate adhesive layer only needs to be very thin and thus does not influence the final parts' performance, e.g. concerning flexibility.

It is another advantage of using silicate glues that they are not solvent, but water based.

It is a further advantage of the claimed material that it will still be flexible enough to bend it around narrow radius or to snap a respective tube around a pipe easily.

A further advantage of the claimed material is the fact that in its preferred compositions it is free of PVC and phthalates, both of them being under survey and being discussed for environmental and health issues.

A further advantage of the claimed material is that its flame retardant properties are almost independent from the geometry of the part to be fire protected.

A further advantage of the claimed material is the possibility to adapt its properties to the desired property profile (concerning mechanics, damping, insulation, flexibility, etc.) by adaptation of the foil type/thickness and/or the fibre type, diameter, length, tissue den, braiding angle etc.

It is a prominent advantage of the claimed material that it can be produced in an economic way in a continuous process, e.g. by extrusion and co-lamination, also with a prefabricated laminate. It shows versatility in possibilities of manufacturing and application. It can be extruded, co-extruded, laminated, moulded, co-moulded, overmoulded, welded etc. directly as a multilayer system and thus it can be applied in unrestricted shaping onto various surfaces in automotive, transport, aeronautics, building and construction, furniture, machinery engineering and many other industries, even by a thermoforming or other shaping methods following the manufacturing process of the material.

It is a further advantage of the claimed material that it can be transformed and given shape by standard methods being widespread in the industry and that it does not require specialized equipment.

It is a further advantage of the claimed material that the insulation effect can be enhanced by using hollow fibres for layers (A) and/or (B).

Another advantage of the material is the fact that the compound (C) can contain scrapped or recycled material of the same or other kind to a very high extent not losing its fire retardant properties.

It therefore is a prominent advantage of the claimed material that the decoupling of the flame retardancy from the expanded polymer leads to the fact that the polymer base and/or the whole elastomeric or thermoplastic elastomer compound can be very economic. Therefore, e.g. NR or SBR based blends can be used as insulation foam, which else would never pass respective flammability regulations as a stand-alone product.

It is a linked advantage of the claimed material that the outer layers provide additional barrier properties and will have positive effect on thermal insulation and vapour diffusion blocking. Typically, the whole composite is showing a water vapour diffusion barrier property of at least µ2500, preferably at least µ5000, especially preferred at least µ10000, according to EN 12086. Vapour barrier properties are essential to prevent corrosion under insulation through condensation of humidity.

A further advantage of the claimed material is its wide temperature range only being determined by the expanded polymer. As an example, a claimed material with expanded silicone elastomer (MVQ) as compound (C) may be used from −100° C. up to +300° C., or up to 400° C. with thermoset foams.

A further advantage of the claimed material is its suitability for thermal and sound/vibration insulation applications, ranging from very low to very high temperatures as mentioned above. As an additional advantage the metal foil will act as a vapour barrier and as a reflector, it furthermore decouples sound. The glass fibre acts as an additional insulation layer, especially when using hollow fibres.

A further advantage of the claimed material is its impact resistance against mechanical load, pressure, notch formation, cuts and bites, including attack by birds, rodents or termites or the like, which is another advantage for outdoor insulation purposes.

It is a further advantage of the claimed material that it has a very high UV and ozone resistance, even if the expanded layer (C) would have no respective resistance.

EXAMPLES

In the following examples and comparative examples the required foams and other materials were acquired on the market (e.g. class 0=class0/Armaflex®, Armacell Ltd., UK; AF=AF/Armaflex®, Armacell GmbH, Germany; same polymer base, but varied additives; HT=HT/Armaflex®, NH=NH/Armaflex, both Armacell GmbH, Germany) or being produced according to state of the art procedures to 25 mm thickness samples. The protective layers were put on the foam parts by slight and constant pressure using adhesives or the like that were available on the market (Hapuflam®: fire protection multilayer fabric system, Hapuflam GmbH, Germany; Flammotect®: fire protection paint/coating, b.i.o. Brandschutz GmbH, Germany, both self-adhesive, others: CR based Adhesive 520, Armacell GmbH, Germany; fibres: STW, Germany, CPE: Tyrin®, Dow Chemical, U.S.A.). In the case of the comparative examples the layers were applied as close as possible to the processing provided by the respective literature.

TABLE 1

Flammability test results of foam compounds according to EN 13823/EN 13501-1 (single burning item/round corner test): flammability and determination of Total Heat Release (THR), Fire Growth Rate (FIGRA), Smoke Growth Rate (SMOGRA) and Total Smoke Production (TSP) by EN 13823; flammability classification in accordance with EN 13501 (best individual classifications: B s1 d0). The examples without asterisks in bold comprise claimed material.

| Foam base | Protective layers * = comparative example | Figra | THR 600 | figra 0.2 | Figra 0.4 | Smogra | TSP 600 | class | class SMOGRA | D class |
|---|---|---|---|---|---|---|---|---|---|---|
| HT | none* | 779 | 8.3 | 779 | 779 | 1286 | 1121 | D | s3 | d0 |
|  | alum. foil* | 521 | 10.5 | 521 | 521 | 587 | 1306 | D | s3 | d0 |
|  | glass fibre* | 128 | 4.0 | 149 | 128 | 263 | 436 | C | s3 | d0 |
|  | 2x glass fibre | 0 | 0.9 | 0 | 0 | 12 | 97 | B | s2 | d0 |
|  | alum. foil + glass fibre | 5 | 1.1 | 5 | 5 | 0 | 22 | B | s2 | d0 |
| Class 0 | none* | 146 | 2.9 | 257 | 146 | 1151 | 315 | C | s3 | d0 |
|  | glass fibre* | 84 | 1.2 | 41 | 84 | 335 | 286 | B | s3 | d0 |
| AF | none* | 76 | 2.1 | 76 | 33 | 1891 | 413 | B | s3 | d0 |
|  | PTFE + glass nonwoven* | 648 | 2.3 | 654 | 648 | 544 | 379 | D | s3 | d0 |
|  | Hapuflam fabric + Hapuflam CP* | 156 | 3.0 | 169 | 156 | 49 | 197 | C | s2 | d0 |
|  | Flammotect S* | 271 | 4.7 | 278 | 271 | 272 | 527 | D | s3 | d0 |
|  | Flammotect A* | 610 | 3.3 | 627 | 610 | 476 | 486 | D | s3 | d0 |
|  | alum. foil* | 90 | 3.6 | 170 | 90 | 368 | 418 | C | s3 | d0 |
|  | glass fibre + alum. foil* 1) | 147 | 2.4 | 147 | 96 | 121 | 368 | C | s3 | d0 |
|  | alum. foil + glass fibre | 0 | 1.0 | 0 | 0 | 36 | 101 | B | s2 | d0 |
| NH | none* | 643 | 6.3 | 697 | 643 | 438 | 183 | D | s3 | d0 |
|  | 2x glass fibre | 73 | 2.0 | 73 | 29 | 50 | 113 | B | s2 | d0 |
|  | alum. foil + glass fibre | 0 | 1.6 | 0 | 0 | 18 | 30 | B | s1 | d0 |

1) foil as outermost layer, as used in most prior art documents.

TABLE 2

Fire test according to EN 13823/EN 13501-1 using the claimed system (A) (B) (C) with different foam layers (C), carried out on sheet-shaped material.

| Foam base | Protective layers *= comparative example | class | SMOGRA class | D class |
|---|---|---|---|---|
| EPDM (rubber) 1) | none* | D | s3 | d0 |
|  | alum. foil + glass fibre | B | s2 | d0 2) |
| NBR/PVC (rubber/TPE) 1) | none* | C | s3 | d0 |
|  | alum. foil + glass fibre | B | s2 | d0 2) |
| NBR (nitrilbutadiene rubber) | none* | D | s3 | d0 |
|  | alum. foil + glass fibre | B | s1 | d0 |
| MVQ (silicone rubber) | none* | D | s1 | d0 |
|  | alum. foil + glass fibre | B | s1 | d0 |

The examples without asterisks in bold comprise claimed material.

1) The systems based on NBR/PVC and EPDM have been tested according to ASTM E84 standard (tunnel burn test) reaching the classification flame spread/smoke of 25/50 (best in class).

2) B s1 d0 with silicate adhesive (Rutland, U.S.A.).

TABLE 3

Fire test according to EN 13823/EN 13501-1 using the claimed system (A) (B) (C) with different fibrous layers (C), carried out on EPDM sheet-shaped material.

| Protective layers *= comparative example | class | SMOGRA | D class |
|---|---|---|---|
| none* | D | s3 | d0 |
| aluminium foil + glass fibre | B | s2 | d0 1) |
| aluminium foil + bamboo fibre | C | s2 | d0 |

TABLE 3-continued

Fire test according to EN 13823/EN 13501-1 using the claimed system (A) (B) (C) with different fibrous layers (C), carried out on EPDM sheet-shaped material.

| Protective layers<br>*= comparative example | class | class SMOGRA | D class |
|---|---|---|---|
| aluminium foil + bamboo fibre (embedded to 50 weight-% in CPE) | B | s3 | d0 2) |
| bamboo fibre + bamboo fibre | C | s3 | d0 |
| aluminium foil + hemp | C | s3 | d0 |
| hemp + hemp | C | s3 | d0 |
| hemp + hemp (embedded to 50 weight-% in CPE) | B | s3 | d0 2) |

All examples without asterisks comprise claimed material.
1) B s1 d0 with silicate adhesive.
2) B s2 d0 when embedded into silicate adhesive.

We claim:

1. A material comprising an elastomer or thermoplastic elastomer being expanded to a density of less than 200 kg/m$^3$ according to ISO 845 as a core (C) being covered with at least one inner protective layer (B) comprising a metal foil showing a thickness of 1-400 microns, or fibrous material which is at least flame retardant according to DIN 4102 B1 and/or ASTM E-84 flame spread 100 and outer protective layer (A) consisting of fibrous material which is at least flame retardant according to DIN 4102 B1 and/or ASTM E-84 flame spread 100 and wherein, if (A) and (B) are both of fibrous nature, the ratio of average mesh or sieve opening of (A) to (B) is bigger than 1:1, wherein the outer protective layer (A) is the outermost layer of said material, wherein the closed cell content of the expanded core (C) is at least 80%.

2. The material according to claim 1 wherein the metal foil of (B) is aluminium.

3. The material according to claim 1 wherein the fibrous material of (A) and/or (B) is in the form of a weave fabric, knitted fabric, unidirectional weave or nonwoven.

4. The material according to claim 1 wherein the fibrous material of (A) and/or (B) is embedded to at least 30 weight percent into a matrix, preferably into a fire retardant and/or non flammable and/or halogenated material, especially preferred into CPE and/or PVC and/or silicate based adhesive.

5. The material according to claim 3 wherein the fibrous material of (A) and/or (B) is glass fibre.

6. The material according to claim 1 wherein the fibrous material of (A) shows an average mesh size or sieve opening of 0.01 to 2.00 mm and has average thread or fibre density of 5 to 500 per cm.

7. The material according to claim 1 wherein the fibrous material of (B) shows an average mesh or sieve opening size for the tissue of 0.01 to 0.80 mm and has average thread or fibre density of 5 to 250 per cm.

8. The material according to claim 1 wherein at least the layers (A) and (B) are bonded with a flame retardant and/or non flammable compound, preferably a flame retardant and/or non flammable adhesive.

9. The material according to claim 8 wherein the flame retardant and/or non flammable compound is pre-applied on layer (B) or between layers (A) and (B) before final lamination onto (C).

10. The material according to claim 8 wherein the flame retardant and/or non flammable compound is based on halogen containing and/or silicate compounds.

11. The material according to claim 1 wherein additional layers are applied for protection, reinforcement and decoration purposes.

12. The material according to claim 1 wherein the layers except (A) to (B) are bonded by the use of an adhesive and/or hot melt and/or thermoplastic.

13. The material according to claim 12, wherein the adhesive and/or hot melt and/or thermoplastic is already pre-applied on at least one side of layer (B) or between and/or on top of at least one side of layers (A) and (B) before final lamination onto (C).

14. The material according to claim 13 comprising a prefabricated composite of at least layers (A) and (B), and wherein said prefabricated composite is applied with an adhesive and/or hot melt and/or thermoplastic on one or more sides of (C).

15. The material according to claim 1, wherein layer (A) and/or layer (B) form one or more overlaps that can be used to form butt joint seals and/or seam seals between multilayer parts of at least (A)(B)(C) configuration and/or between said multilayer parts and other materials.

16. The material according to claim 1, wherein surface structures are applied on the inner and/or outer side of the (A)(B)(C) composite to improve sound/thermal decoupling, adhesion and flame/heat dispersion.

17. The material according to claim 1 wherein the whole composite is showing a water vapour diffusion barrier property of at least μ 2500 according to EN 12086.

18. The material according to claim 1 wherein the whole composite has a thermal conductivity of less than 0.080 W/m*K at 0° C. according to EN 12667.

19. A process for manufacturing the material according to claim 1 in a continuous process.

20. The process for manufacturing the material according to claim 19 in a continuous two-step-extrusion/expansion and lamination process.

21. The process for manufacturing the material according to claim 19 where a prefabricated composite of at least (A) and (B) is laminated onto (C).

22. A method of providing thermal insulation and/or sound insulation and/or vibration damping insulation and/or fire protection insulation, comprising affixing the material of claim 1 to the inside or outside of structures, vessels, containers and/or pipes.

23. The method of claim 22, wherein said material is affixed to walls, ceilings, floors, roofs, tanks, tubes, and ducts.

* * * * *